United States Patent [19]

Somerville

[11] Patent Number: 5,516,282

[45] Date of Patent: May 14, 1996

[54] BURNER TUBE AND SPACE HEATER EMPLOYING THE TUBE

[75] Inventor: William A. Somerville, Calgary, Canada

[73] Assignee: Unique Marketing 2000 Inc., Calgary, Canada

[21] Appl. No.: 367,723

[22] Filed: Jan. 3, 1995

[51] Int. Cl.⁶ .............................................. F23D 00/000
[52] U.S. Cl. .......................... 431/352; 431/350; 431/355; 431/201; 126/110 R
[58] Field of Search .................... 431/355, 350, 431/353, 352, 201, 198, 200; 126/110 R

[56] References Cited

U.S. PATENT DOCUMENTS

| 2,107,365 | 2/1938 | Bray. | |
|---|---|---|---|
| 4,122,670 | 10/1978 | Rerder | 431/352 X |
| 4,286,943 | 9/1981 | Petlak | 431/352 |
| 5,076,781 | 12/1991 | Cremers | 431/2 X |
| 5,105,621 | 4/1992 | Simmons et al. | 431/352 X |
| 5,277,578 | 1/1994 | Ratnani et al. | 431/352 X |
| 5,423,674 | 6/1995 | Knöpfet et al. | 431/352 X |

Primary Examiner—Larry Jones

[57] ABSTRACT

A pressurized space heater for burning gaseous fuel has as its main component a generally conical burner tube that receives at its narrow end a combustible mixture of fuel and primary air. Complete combustion in the tube is enhanced by two sets of holes disposed along the tube for admitting secondary air. The location, number and sizes of the holes are so chosen as to ensure complete combustion and to avoid the production of noxious substances.

12 Claims, 2 Drawing Sheets

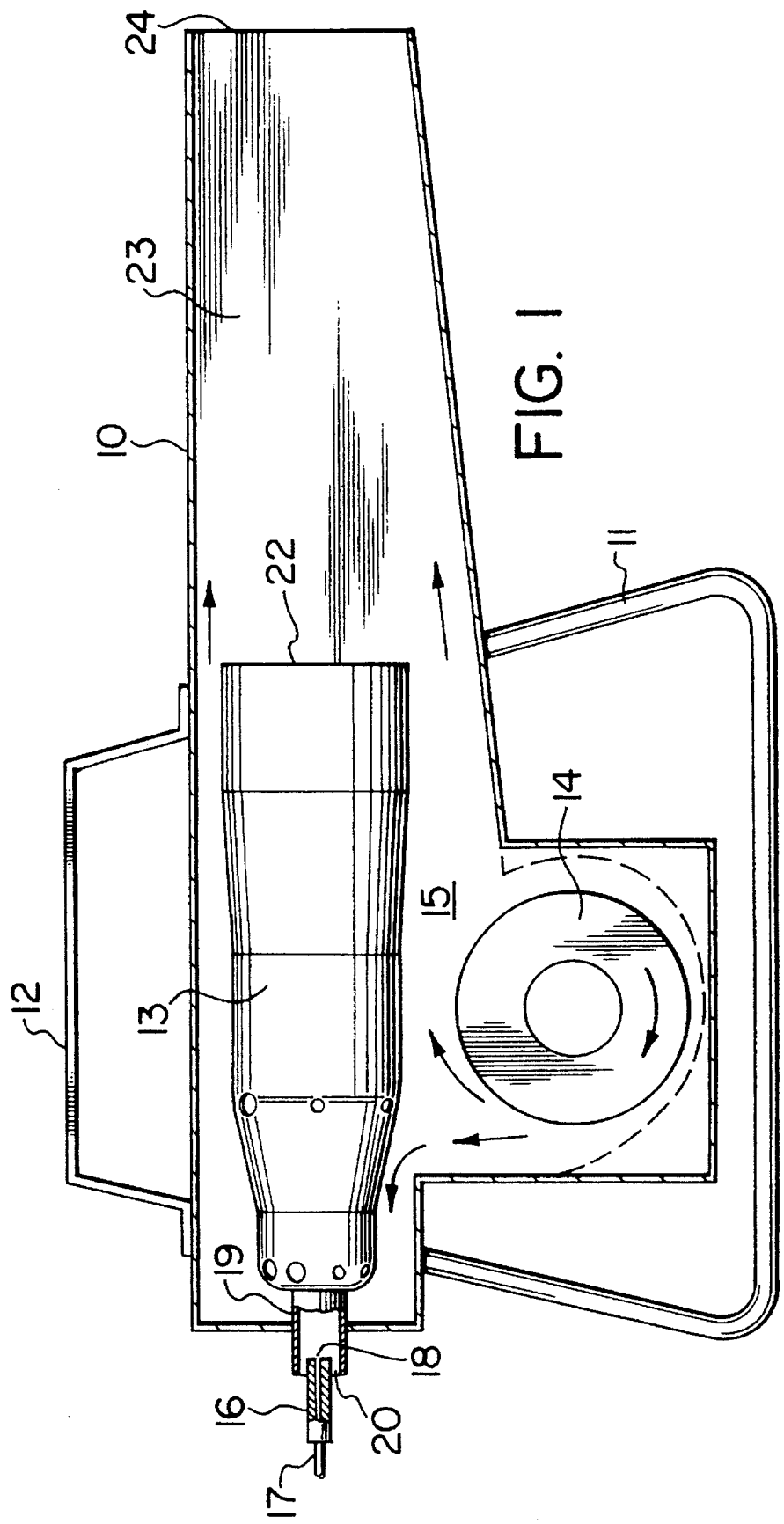

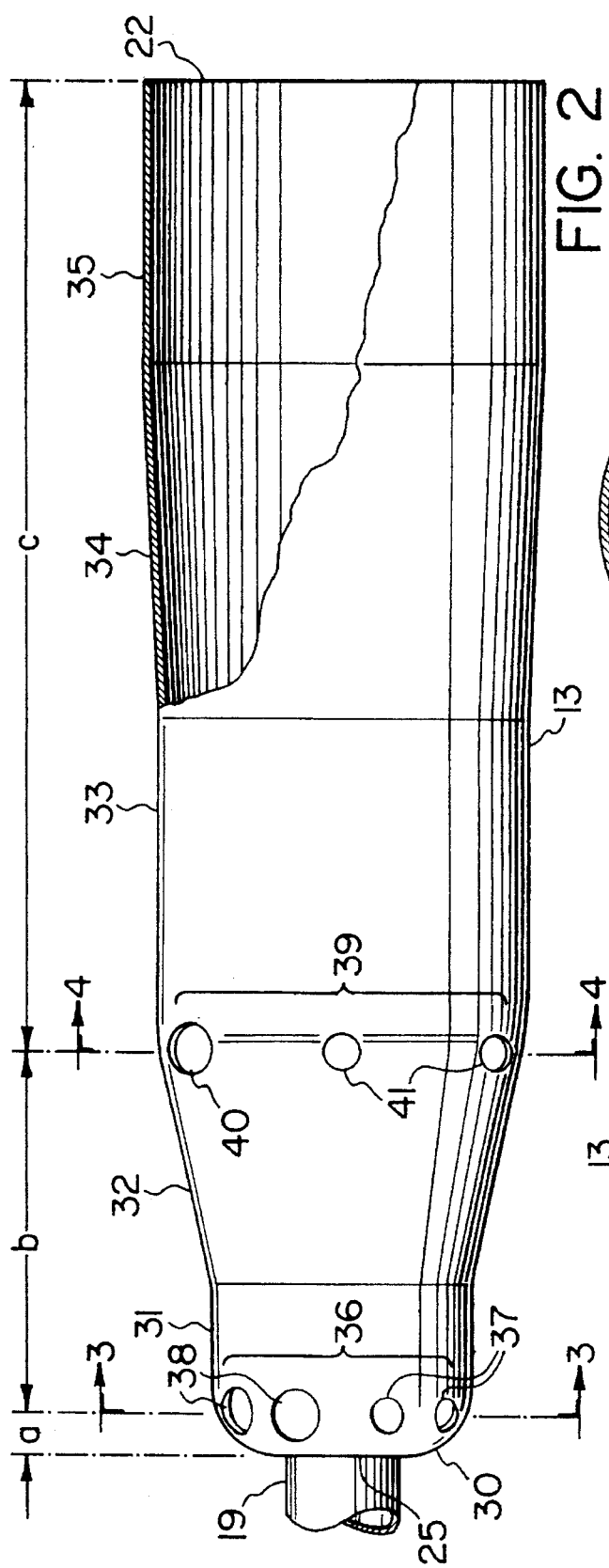
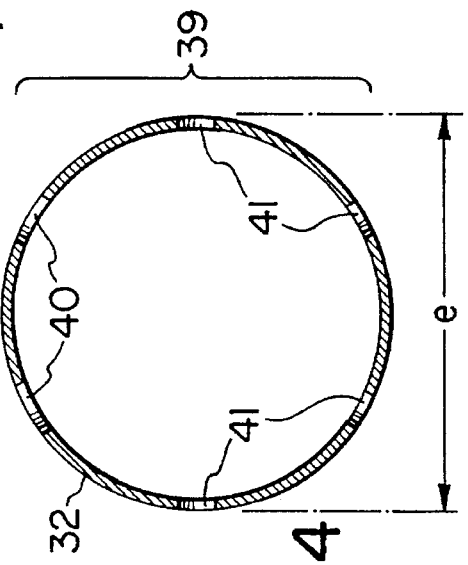
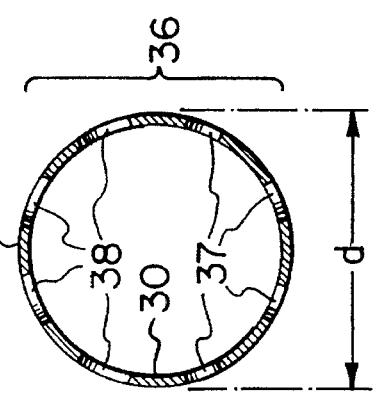

1

BURNER TUBE AND SPACE HEATER EMPLOYING THE TUBE

FIELD OF THE INVENTION

The present invention relates to improvements in a burner tube for use in a pressurized space heater or the equivalent for burning a gaseous fuel such as propane, natural gas, etc.

BACKGROUND OF THE INVENTION

Difficulties that have been encountered in the past with heaters burning gaseous fuel include
 (a) incomplete combustion,
 (b) the generation of noxious gases, such as CO, NOX, and aldehydes.
Any one of these results is undesirable.

SUMMARY OF THE INVENTION

The object of the present invention is to provide an improved burner tube for burning a gaseous fuel in a pressurized space heater, while substantially avoiding incomplete combustion and also avoiding the formation of any significant amount of any of the undesirable substances listed above.

To this end, the invention provides a burner tube for use in a pressurized space heater, said tube having a relatively narrow entrance end for receiving a mixture of a combustible gas and primary air and expanding generally conically from said entrance end to a mouth for discharging combustion products into the heater, the tube having two sets of circumferentially arranged holes for admitting secondary air from the pressurized heater into the tube, the location, number and sizes of the holes being such as to achieve substantially complete combustion of the gas and the production of substantially no noxious substances.

The invention is also directed to a space heater using the burner tube, and, in this context and in accordance with preferred, but not necessarily essential, features of the invention, there is provided a space heater comprising an elongate casing, a burner tube extending along the casing to a mouth thereof, a fan for introducing air under pressure into the casing on one side of the tube, and a mixing tube for mixing gaseous fuel with primary air, the burner tube having a relatively narrow entrance arranged to receive a combustible mixture from the mixing tube and expanding generally conically to a wider mouth for discharging combustion products into the casing for travel with air from the fan out of the mouth of the casing, the burner tube having two sets of circumferentially arranged holes for admitting secondary air from the casing into the tube, a first of said sets being located close to said entrance to the tube and a second of said sets being located along the tube towards the mouth thereof, and the holes of each set providing a greater total area for the admission of air to the tube on the side of the tube remote from the fan than on the side of the tube adjacent the fan.

BRIEF DESCRIPTION OF THE DRAWINGS

FIG. 1 is a cut away and somewhat diagrammatic side view of a space heater in which a burner tube according to an embodiment of the present invention is employed;

FIG. 2 is a larger scale side view of the burner tube itself; and

FIGS. 3 and 4 are respectively sections taken on the lines 3—3 and 4—4 in FIG. 2 with elements in the background omitted for clarity, since the purpose of these sectional views is to illustrate the circumferential positioning of holes in the tube.

DETAILED DESCRIPTION OF THE PREFERRED EMBODIMENT

As shown in FIG. 1, the heater comprises an elongate portable casing 10 mounted on support legs 11 and provided with a carrying handle 12. The casing supports a burner tube 13 that is arranged generally coaxially within the casing. The casing also serves to mount an assembly 14 of a fan and fan motor beneath the tube 13. The fan draws in air from the side of the apparatus and projects it upwardly as shown by the arrows towards the space 15 in the casing around the burner tube 13 and ultimately out of the mouth 24 of the casing.

A fuel supply assembly 16 that includes a conventional pressure reducing valve (not shown) will be connected via a gas supply hose 17 to a propane bottle or other fuel container (not shown). The fuel supply assembly 16 has an orifice 18 out of which the gaseous fuel flows under pressure into a cylindrical mixing tube 19. A gap 20 around the assembly 16 allows primary air to be drawn into the tube 19 by the reduced pressure caused by the high speed gas flow, such air mixing with the combustible gas.

At its downstream end the mixing tube 19 extends into the burner tube 13 where the combustion occurs. Secondary air is drawn into the tube 13 through two series of holes extending circumferentially around this tube. The combustion products are discharged from the mouth 22 of the tube 13 to flow into the downstream portion 23 of the casing 10 where they mix with further air that flows along the casing outside the burner tube as a result of the air pressure provided by the fan. Finally, the heated air mixed with the combustion products is propelled from the mouth 24 of the casing 10.

Other elements that are employed, but are not illustrated because they are conventional, include an igniter situated at or near the mouth 22 of the tube 13, a thermocouple projecting into the tube 13 towards its downstream end, and an electrical system for controlling the performance of the apparatus. Where the gas hose 17 connects to the heater there is a shut-off valve. The last item in the gas line before the orifice 18 is a manually openable thermocouple valve. After turning on the gas supply to the heater, the operator pushes this valve down to allow the gas to flow to the orifice. The operator then operates the igniter to ignite the mixture. When the thermocouple heats up the milivolt control moves a lever inside the gas valve to keep it open. If the flame is extinguished, the thermocouple cools and releases this lever to automatically shut off the gas supply to the orifice. The burner tube 13 is shown in greater detail and more accurately in FIGS. 2 to 4, the representation of this tube in FIG. 1 being merely diagrammatic and designed to show the orientation of the tube 13 relative to the outer casing 10. For the shape and structure of the tube 13 and its holes reliance should be placed on FIG. 2.

The tube 13 diverges in steps from its entrance end 25, where it receives the combustible mixture from the mixing tube 19, to its mouth 22. As seen in FIG. 2, there is first a sharply expanding curved portion 30; then a cylindrical portion 31; then a conically expanding portion 32; next a cylindrical portion 33; next a slightly conically expanding portion 34; and finally a cylindrical portion 35. The tube 13 constitutes a single combustion chamber uninterrupted by any internal baffles, grids or the like sometimes found in burner tubes.

There are two sets of holes for the admission of secondary air into the tube 13. The first set 36 comprises four holes 37 and four holes 38 (see also FIG. 3) distributed substantially uniformly around the tube portion 30, the holes 37 being formed on the underside of the tube (nearer the air supply from the fan) and the holes 38 being formed on its upper side (more remote from this air supply). The second set 39 of air holes (see also FIG. 4), which comprises two holes 40 on the upper side of the tube and four holes 41 (two at the sides and two at the underside of the tube), is located in the expanding portion 32 of the tube 13 just before the cylindrical portion 33.

Since the relative locations and sizes of the holes are important for achieving optimum performance, some preferred dimensions are given below, although it is to be understood that the invention is not limited to these values.

The overall length of the tube 13 (a+b+c in FIG. 2) is approximately 136 units. A unit can conveniently be a sixteenth of an inch, in which case the overall length of the tube 13 is approximately 8½", but a unit need not necessarily have this value. The size of the tube may require be scaled up or down for different installations. The distance a of the centre line of the first set of holes 36 from the entrance 25 of the tube 13 is approximately 6 units; the distance b of the centre line of the first set of holes 36 to that of the second set of holes 39 is approximately 34 units; and the distance c of the centre line of the second set of holes 39 to the mouth 22 of the tube is approximately 96 units.

The four lower holes 37 of the first set 36 each has a diameter of approximately 3½ units, e.g. 7/32", while the four upper holes 38 of this first set each has a diameter of approximately 5 units, e.g. 5/16". This means that the total area for air entry provided by the combination of the four upper holes 38 has a ratio of approximately 1.4 to the total air entry area provided by the combined lower holes 37.

This ratio may need to be varied somewhat by changes in other parameters, such as the dimensions of the outer casing 10 and the degree of superatmospheric pressure provided by the fan 14, but it will always be greater than one and typically will be within the range of approximately 1.3 to 1.5.

In a similar manner, the two top holes 40 of the second set 39 each has a diameter of 5 units, e.g. 5/16", while the four side and bottom holes 41 each has a diameter of 3½ units, e.g. 7/32", affording a similar air admission ratio of approximately 1.4 between the two larger upper holes 40 and the two lower smaller holes 41. In this instance, however, the two side holes 41 somewhat reduce the impact of the difference between the upper hole air admission area and the lower hole air admission area. Nevertheless, the ratio of air admission areas between the larger and smaller holes still has a value greater than one.

The diameter of the tube 13 at its mouth 22 is approximately 40 units, e.g. 2½", and it is reduced down to about 11 units, e.g. 11/16", at its entrance 25. The first set of holes 36 is located at a position where the tube 13 has a diameter d (FIG. 3) of approximately 26 units, e.g. 1⅝", and the second set of holes 39 is located at a position where tube 13 has a diameter e (FIG. 4) of approximately 35 units, e.g. 2 3/16". Note that this second set 39 is located in the portion 32 of the tube 13 that is frusto-conical. This has the effect of giving the flow of air passing into the combustion chamber in the tube 13 through these holes some axial component in the downstream direction of the tube 13. For a similar purpose the first set of holes 36 is located where the tube is inclined, i.e. in the curved portion 30.

The particular tube dimensions enumerated above have been found to be especially effective in achieving the objectives of the present invention, namely the achievement of a level of combustion that is substantially complete and the avoidance of the production of any significant amounts of any of the noxious gases mentioned above.

In order to assess the criticality of these dimensions, some experiments have been conducted on variations of the tube 13 as follows:

The number of holes of the first set 36 was reduced to four instead of eight and they were all made 2½ units in diameter. This arrangement was satisfactory at low fire, but in the high fire position of the burner it produced CO. The diameter of these holes was then increased to 3½ units. This improved the CO situation at high fire but distorted the flame to the upper half of the tube. The number of holes of this first set 36 was then returned to eight, all 3½ units in diameter. This caused the flame to distort even higher to the top side of the tube and started to produce aldehydes. The next experiment was to use ten holes in the first set, all 3½ units in diameter. The production of aldehydes worsened. The next try was to revert to eight holes with the upper ones each having a diameter of 4 units and the lower ones each having a diameter of 3½ units. This change showed improvement, bringing the flame down slightly in the burner and stopping the production of aldehydes, but not CO. The next change was to retain the eight holes but change the diameter of the upper holes to 5 units while retaining that of the lower holes at 3½ units, i.e. achieving the preferred arrangement described above. This change centered the flame well in the burner, although there was still some CO produced.

It should be explained that while these changes to the first set of holes 36 was being made, the location of the second set of holes 39 had been moved to a position where c equalled approximately 88 units instead of 96. This experiment led to the conclusion that with this value for c (namely 88) it was impossible to achieve perfect performance even with the optimum number and sizing of the holes of the first set 36. For this reason the second set of holes was moved to its preferred location (c=96) and the holes were located and sized as set out above for the preferred embodiment of the invention. As a result of this change, the flame was found to travel straight down the center of the tube, while no CO, no NOX and no aldehydes were produced.

From these experiments it becomes clear that, for the achievement of the best performance, the location of the second set of holes is important, the preferred ratio of c to b being approximately 2.8, e.g. 96 units to 34 units.

I claim:

1. A space heater comprising an elongate casing, a burner tube extending along the casing to a mouth thereof, a fan for introducing air under pressure into the casing on one side of the burner tube, and a mixing tube for mixing gaseous fuel with primary air, the burner tube having a relatively narrow entrance arranged to receive a combustible mixture from the mixing tube and expanding generally conically to a wider mouth for discharging combustion products into the casing for travel with air from the fan out of the mouth of the casing, the burner tube having two sets of circumferentially arranged holes for admitting secondary air from the casing into the tube, a first of said sets being located close to said entrance to the tube and a second of said sets being located along the tube towards its mouth, and the holes of each set providing a greater total area for the admission of air to the burner tube on the side of said tube remote from the fan than on the side adjacent the fan.

2. A space heater according to claim 1, wherein the ratio of the distance of the second set of holes from the mouth of the tube to the distance between the two sets of holes is approximately 2.8.

3. A space heater according to claim 1, wherein the first set contains eight holes and the second set contains six holes.

4. A pressurized space heater comprising
   a) a casing defining an elongate space extending to a mouth;
   (b) a burner tube having a relatively narrow entrance end for receiving a mixture of a combustible gas and primary air and expanding generally conically from said entrance end to a mouth for discharging combustion products, the burner tube being mounted in the casing to extend along said space to discharge said combustion products towards the mouth of the casing;
   (c) means for introducing air under pressure into a side of the casing and directing said air towards a first side of the burner tube;
   (d) said burner tube having at least one set of circumferentially arranged holes for admitting secondary air into the tube from the space around the tube in the casing, the holes of each set having an area for the flow of this secondary air into the burner tube on said first side of the tube that is smaller than the area of the holes away from said first side of the tube.

5. A heater according to claim 4, wherein the ratio between the area of the holes away from the first side of the tube and the area of the holes on the first side of the tube is approximately 1.4.

6. A heater according to claim 4, wherein said burner tube has two of said sets of holes arranged circumferentially around the tube, said sets being spaced apart from each other along the tube.

7. A heater according to claim 6, wherein a first of said sets of holes is located closely adjacent the entrance end of the tube, which end is sharply expanding so that air passing into the tube through said first set of holes has a component of travel along the tube.

8. A heater according to claim 7, wherein there are eight holes in the first set, four of these holes being larger than the other four, and the larger holes being located away from the first side of the burner tube.

9. A heater according to claim 7, wherein a second of said sets of holes is located along the tube towards its mouth from the first set.

10. A heater according to claim 9, wherein the ratio of the distance of the second set of holes from the mouth of the tube to the distance between the two sets of holes is approximately 2.8.

11. A heater according to claim 9, wherein there are six holes in the second set, two on the first side of the tube, two on a second side of the tube opposite the first side, and two between the two sides of the tube.

12. A heater according to claim 9, wherein the burner tube comprises alternating cylindrical and conically expanding sections, the second set of holes being located in a said conically expanding section so that air passing into the tube through said second set of holes has a component of travel along the tube.

* * * * *